Figure 1:
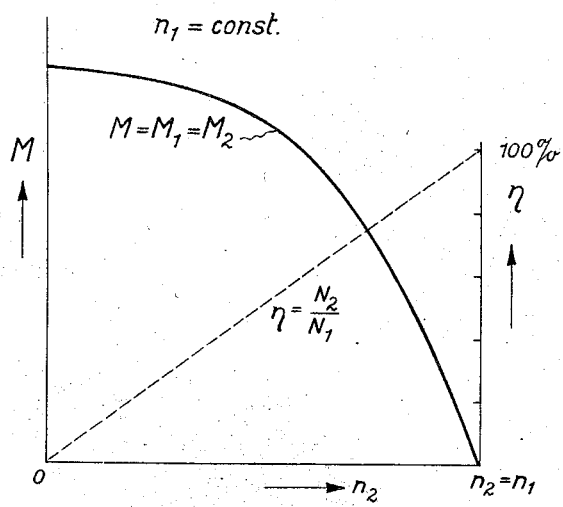

Inventor:
Hermann Föttinger
By Emil Bönnelycke
Attorney

Sept. 14, 1937.　　　　H. FÖTTINGER　　　　2,093,042
GEAR SYSTEM WITH FLYWHEELS
Filed Oct. 17, 1934　　　3 Sheets-Sheet 3

Inventor:
Hermann Föttinger
By Emil Bönnelycke
Attorney

Patented Sept. 14, 1937

2,093,042

UNITED STATES PATENT OFFICE 2,093,042

GEAR SYSTEM WITH FLYWHEELS

Hermann Föttinger, Berlin-Wilmersdorf, Germany

Application October 17, 1934, Serial No. 748,706
In Germany October 19, 1933

16 Claims. (Cl. 74—189.5)

The invention relates to a gear system for starting, rapidly accelerating and keeping in movement any inert masses, such as flywheels, tube mills, pumps with long pressure piping or entire machines, which gear comprises small motors, hydraulic or mechanical gears per se known and small auxiliary flywheels rotating at high speed. I have already suggested devices for accelerating railroad trains driven by low-speed combustion engines which are provided with flywheels storing the starting power and adapted to be driven and "charged" or the energy stored by the main shaft through an arrangement changing over to a higher speed. In that instance it was intended to transmit the power to the rotating masses by one or more disconnectable electric or hydraulic asynchronous couplings. Even by this prior invention it was possible to have for use, in starting and for a definite time, the multiple of the continuous output of the engine otherwise available. The object of this invention is to extend this type of power multiplication by storing to a substantially enlarged field and to improve it economically while at the same time there are obviated the inconveniences inherent in the system so far known and chiefly consisting in the exclusive use of asynchronous couplings.

Figure 2:
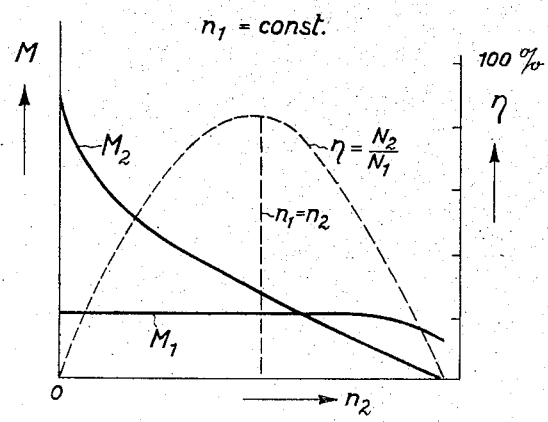

Referring to the drawings:

Figure 1 is a diagram showing the moment characteristic of a drive with a Föttinger coupling, Fig. 2 is a similar view utilizing a Föttinger transformer, and Figs. 3 to 6 are diagrammatic elevational views, partly in section of different modified constructional mechanisms according to this invention.

Hydraulic asynchronous couplings comprise a primary or pump wheel I and a secondary or turbine wheel II without stationary parts of reaction, particularly stationary guide wheels. Both the primary and secondary torques $M_1$ and $M_2$ are therefore of exactly the same magnitude, neither an increase of the torque (conversion of power) nor an increase of the secondary speed $n_2$ beyond the primary speed $n_1$ being thus possible.

Practically there must even exist a certain amount of slip $$\frac{n_1 - n_2}{n_1} = 1 \text{ to } 5\%$$

When the primary speed $n_1$ is kept constant by means of a sufficiently powerful prime mover and the secondary speed $n_2$ is modified by the application of various resistances, according to Fig. 1 there is transmitted in the start ($n_2=0$) a definite maximum torque $M=M_1=M_2$ which with increasing $n_2$ drops at first slowly and then increases more quickly and eventually disappears when synchronism ($n_2=n_1$) is arrived at.

In the same measure as the torques are also changed the horse-power is to be spent when the primary speed is kept constant.

The efficiency of transmission $\eta$ (=ratio of the horse-powers $N_2:N_1$) then increases linearly from nil to 100 per cent.

For many purposes, e. g. the drive of heavy machines or the like by combustion the following drawbacks will result from this system:

(1) In the majority of cases the engines will run with throttled speed; therefore the auxiliary flywheels connected thereto by means of slip couplings will practically almost never be accelerated to their admissible maximum speed, viz. fully "charged", that is charging of the flywheel with energy, and utilized.

(2) Practically the slip couplings will be so dimensioned that at high secondary speeds $n_2$ and continuous output they result in a slip as small as possible (2 to 5%). When the flywheel is being started the amount of slip is however as high as 100%.

The torque characteristics Fig. 1, however, show that at the start the engine torques should be 10 to 20 times higher than those of continuous operation. As the majority of prime movers, particularly combustion engines are not able to comply with this requirement, the engine speed cannot be kept constant as presumed in Fig. 1 but will drop to ⅓ or ¼.

In this instance also the output of the engine will be reduced to a corresponding fraction, viz. also the engine can be utilized to a small fraction only when the flywheel is being "charged".

(3) The said tenfold or twentyfold increase of the torque however also takes place when the flywheel is discharged of its energy and the mass of the machine or the like is started, but for many purposes this amount is excessive, which fact involves the risk that the transmission members break, the driving wheels and the friction clutches, if any, slide and that inadmissible slip is produced in any asynchronous couplings existing, unless the latter are extremely large, which is heavy and expensive.

According to this invention all these inconveniences are obviated in that the charging and/or discharging of the auxiliary rotating masses can be accomplished by means of separate hydraulic transmission gears with stationary guide wheels, so-called torque converters or short converters which can be used in addition to or instead of the slip couplings having no guide wheels.

Fig. 2 shows the absolutely different properties of these converters, again on the supposition that the engine speed $n_1$ is kept constant, in dependence on the secondary speed $n_2$ variable in accordance with the resistance opposed. In this instance the secondary torque $M_2$ may exceed five to eight times the engine torque $M_1$ at starting ($n_2=0$), according to the normal ratio of transmission computed for the normal run. When $n_2$ increases, $M_2$ drops along a curve which is concave at the top. With this arrangement $n_2$ can appreciably exceed the speed corresponding to the synchronous rotation of a coupling, viz. the flywheel can be fully utilized even if the engine is throttled, and its weight can be reduced correspondingly.

The primary torques $M_1$ and outputs $N_1$ taken up remain almost constant so that the engine can be readily maintained at its maximum primary speed $n_1$ and full output and so fully utilized.

The excessive increase of the torque in the discharge will not take place any more. The curve of the efficiency $\eta$ will vary in accordance with a flat curve having an apex and an increased mean value.

Of paramount importance is the substantial increase of the ratio of speeds as effected by the converter. According to the invention this increase further permits the imparting to the flywheel, with the aid of the ratio of the toothed gearing, circumferential speeds as high as 400 to 500 meters per second so that, as compared with prior inventions, the weight of the flywheel can be reduced to one tenth, the small flywheels being forged of very high-grade steel so as to be adapted to the stress developed on account of the increased circumferential speed.

The enormously reduced flywheel weights also result in decreased losses in bearing friction and wind resistance.

According to the invention the converter can also be combined with and alternatingly used instead of the hydraulic slip coupling. As the efficiency of a converter is lower than that of a coupling used with small slip, it is possible to replace the action of the converter by that of a coupling in the range of speeds in which the primary and secondary speeds do not sensibly differ, viz. in the range of the speed of synchronism, the said coupling being cut out directly before the speed of synchronism is arrived at, and replaced again by the converter in order that a higher secondary speed can be attained. This system of working affords the highest efficiency figures.

Also for discharging the auxiliary flywheels there is preferably arranged between the rotating mass and the toothed gearing a separate converter in which the primary and the secondary wheels are disposed inversely as compared with the converter intended for charging energy. For instance, while discharging, there is used at first the said converter, subsequently the coupling equally suitable for charging and discharging, and eventually the converter again.

Figures 3, 6:
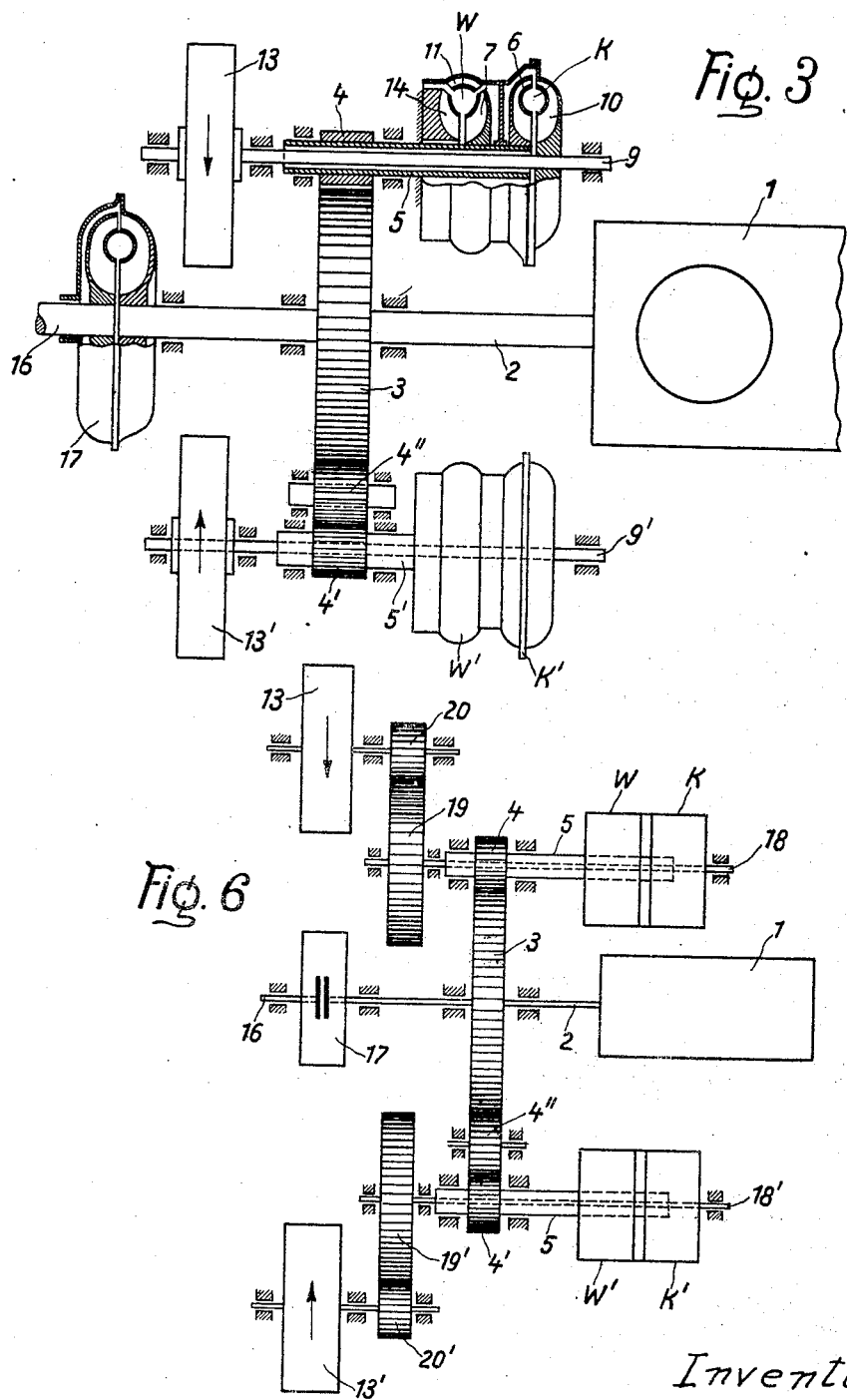

Figs. 3 to 6 diagrammatically show several embodiments of the invention by way of example. Fig. 3 illustrates the combination with the slip coupling K suitable for charging and discharging the flywheels 13 of the energy and 13', and a converter W intended for charging.

The driving engine 1, e. g. a combustion engine, is connected with the pinions 4 and 4' through the main shaft 2 and the large gear wheel 3.

In order that the gyroscopic effect, produced by the increased speed of the flywheels, is obviated, there is interposed an intermediate gear wheel 4" between the gear wheel 3 and the pinion 4' so that the two flywheels 13 and 13' rotate in different directions and with contrary gyroscopic effects. The pinions 4 and 4' are secured to hollow shafts 5 and 5' which are in turn each rigidly connected with a wheel of the couplings K and K' respectively having no guide wheel and the pump wheels 7 and 7' respectively of converters W and W' respectively provided with a stationary guide wheel 14. The corresponding secondary wheels 10 and 11 respectively of the coupling K and the converter W are keyed on a shaft 9 revoluble within the hollow shaft 5 and carrying the flywheel 13 at its other end. Between the large gear wheel 3 and the driven shaft 16 is interposed a disconnectable coupling 17 which may be a hydraulic or a mechanical coupling or a combination of hydraulic and mechanical couplings or of any other type, e. g., a freewheel susceptible of being disconnected if necessary.

When the flywheels 13 and 13' are to be charged with energy in the machine which has not yet started, the coupling 17 is disconnected and the converter W thrown in. On account of the functions already stated of the converter the speed and the output of the driving engine 1 can be adjusted to their full amount and the flywheels charged within a very short time and with high efficiency. Charging energy may also be accomplished by braking the vehicle in which case the braking energy of the mass of the vehicle is stored for the acceleration phase of the flywheel. In the latter instance the coupling 17 is thrown in and the engine throttled but temporarily.

The flywheels can be discharged of their energy for accelerating the machine or other masses, by throwing in the couplings K and 17. As the couplings are able to transmit the torque without loss, a very high torque is available for the starting acceleration the magnitude of which torque can be controlled by the corresponding amount of fullness of the said coupling.

As already stated, the coupling K may also be used when the rotating masses are to be charged with energy, by the converter W being at first thrown in and disconnected but when the slip existing between the primary and secondary speeds amounts to, e. g., 20 to 15% only. This being the case, the coupling K assumes the transmission until at 2 to 3% slip the converter W is thrown in again and caused to bring the flywheels up to the supersynchronous speed.

Figure 4:
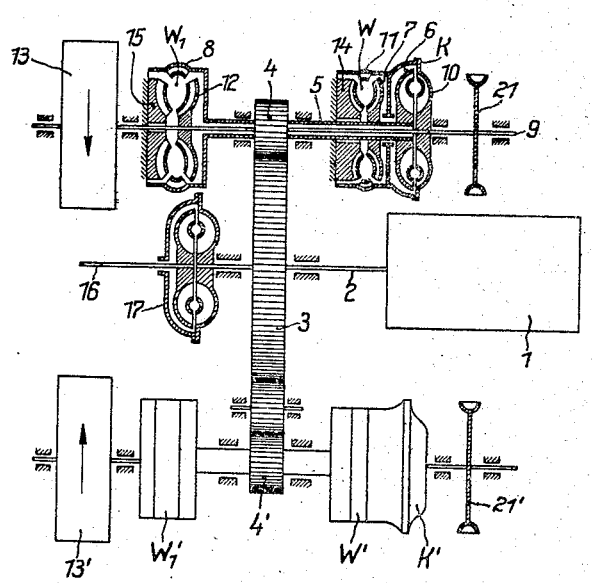

Fig. 4 shows an embodiment in which between the pinion 4 and the flywheels 13 there is inserted an additional converter $W_1$ the primary wheel 12 of which is connected with the flywheel shaft and the secondary wheel 8 with the hollow shaft 5. The said converter $W_1$, when combined with the coupling K, permits any regulation desired of the torque when the flywheel is being discharged of its energy.

In either embodiment the flywheels may also be temporarily accelerated or kept in motion by separate driving engines coupled with the shaft 9, such as electric motors, steam, exhaust-gas or compressed-air turbines. Fig. 4 of the drawings shows a modification for such an auxiliary drive.

The two flywheels 13 and 13' are driven by the small turbines 21 and 21' which are of a type which may be driven by exhaust gases or steam or also by fluids. The same may be fed and provided with the driving fluid from the main engine or any other engine or indirectly from a hydraulic transmission gear connected thereto.

Figure 5:
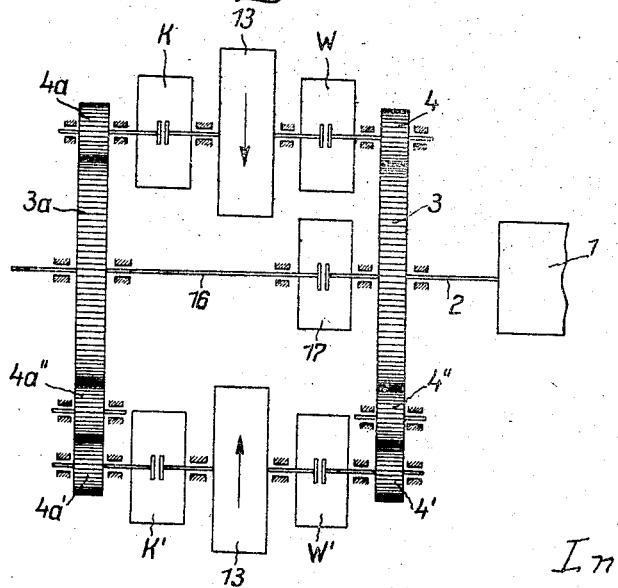

To the single transmission gear 3, 4 intended for charging and discharging energy into and from the flywheels there may also be substituted, according to Fig. 5, two gears, 3, 4, and 3a, 4a one of which is used for charging energy and the other for discharging the stored energy. In this case the flywheels are e. g. disposed between the pinions and capable of being disconnected on either side by a converter W and/or a coupling K from the particular gearing. This arrangement affords the advantage that the coupling 17 keyed on the main shaft must be dimensioned for the maximum torque of the engine 1 only while in the case of the prior embodiments it had to be proportioned for transmitting the enormous additional torque of the flywheels.

As the very high speed of the flywheels would result in very small dimensions of the hydraulic gears, practically almost unfeasible, it is also possible to make the mechanical gears with two stages and to dispose the hydraulic couplings and/or converters on the intermediate shaft as is shown by Fig. 6. The couplings K and the converters W are carried by the intermediate shafts 18 and 18' respectively which drive the auxiliary flywheels 13 through the tooth wheels 19, 19' and 20, 20' respectively.

With the aid of the described gears it is e. g. possible to store a substantial amount of energy in the flywheels of running railroad trains, railroad motorcars, automobiles or the like while they are being braked or while they are standing or the engine is running with a reduced output, which energy is utilized as an additional multiple engine output when it is a question of accelerating the vehicle again. The latter then requires a comparatively weak driving engine since the largest portion of the energy is stored. The same arrangement can also be used for the drive of working machines, such as mills, pumps, lifting and conveying machines, converters and machines which are subject to intermittent loads in railroad service or rolling mills.

A particular advantage is then afforded by the fact that e. g. in the case of electric drive, both the distributing network and the power station are largely relieved from high peak outputs, especially in railroad or tramway service, so that the size of the machines to be held at disposal and thus the capital cost can be correspondingly reduced.

On account of the increase of speed made possible by the converter described the energy to be spent for accelerating an automobile weighing 1200 kg., from nil to 72 km. per hour can be developed by an auxiliary flywheel of 2 kg. only, on the assumption of an ideal transmission and by an 8 kg. flywheel when the efficiency amounts to 25%.

I claim:

1. A gear system, comprising a main driving shaft, a driven shaft, a coupling interposed between said driving and driven shafts and adapted to connect or disconnect same, a second pair of shafts, a gearing connecting the one shaft of said second pair with the driving shaft, a flywheel adapted to be charged by said driving shaft and mounted on the second shaft of said second pair, and a converter having a stationary wheel and rotatable wheels which latter are connected with the two shafts of the second pair respectively.

2. A gear system according to claim 1, in which a hydraulic coupling is provided the two parts of which are also connected with the two shafts of the second pair respectively, so that said flywheel may be charged and discharged by means of said converter and said coupling alternatively.

3. A gear system, comprising a main driving shaft, a driven shaft, a coupling interposed between said driving and driven shafts and adapted to connect or disconnect the shafts, a plurality of further pairs of shafts, a gearing connecting the one shaft of each of said further pairs with the driving shaft, a plurality of flywheels adapted to be charged and discharged by said driving shaft and each mounted on one of the second shafts of said further pairs, and a plurality of converters each having a stationary wheel and rotatable wheels the latter of which are connected with the two shafts of one of the said further pairs of shafts respectively.

4. A gear system according to claim 3, in which a plurality of hydraulic couplings are provided, the two parts of each of said couplings also being connected with the two shafts of one of the said further pairs of shafts respectively so that the flywheels may be charged and discharged by means of said converters and said couplings alternatively.

5. A gear system, comprising a main driving shaft, a driven shaft, a coupling interposed between said driving and driven shafts and adapted to connect or disconnect the shafts, a second pair of shafts, a gearing connecting one shaft of said second pair with the driving shaft, a flywheel adapted to be charged by said driving shaft and mounted on the second shaft of said second pair, and two converters each having a stationary wheel and rotatable wheels the latter of which are connected with the two shafts of the second pair respectively.

6. A gear system according to claim 5, in which a hydraulic coupling is provided the two parts of which are also connected with the two shafts of the second pair respectively so that said flywheel may be charged and discharged by means of said converters and said coupling alternatively.

7. A gear system comprising a main driving shaft, a driven shaft, a coupling interposed between said driving and driven shafts and adapted to connect or disconnect the shafts, a second pair of shafts, two pinions arranged on one shaft of said second pair and on the driving shaft respectively and connecting these shafts, a flywheel adapted to be charged by said driving shaft and mounted on the second shaft of said second pair, and a converter interposed between the pinions and the flywheel in the direction of the flow of power and having a stationary wheel and rotatable wheels the latter of which are connected with the two shafts of the second pair respectively.

8. A gear system according to claim 7, in which a hydraulic coupling is provided the two parts of which are also interposed between the pinions and the flywheel in the direction of the flow of power and connected with the two shafts of the second pair respectively so that said flywheel may be charged and discharged by means of said converter and said coupling alternatively.

9. A gear system, comprising a driving main shaft, a driven shaft, a coupling interposed between said driving and driven shafts and adapted to connect or disconnect the shafts, a hollow shaft, a gearing connecting said hollow shaft with the driving shaft, a further shaft revolvable within said hollow shaft, a flywheel adapted to be charged by the said driving shaft and mounted on said further shaft, and a converter having a stationary wheel and rotatable wheels the latter of which are connected with the said hollow shaft and said further shaft respectively.

10. A gear system, comprising a main driving shaft, a driven shaft, a coupling interposed between said driving and driven shafts and adapted to connect or disconnect the shafts, a hollow shaft, a gearing connecting said hollow shaft with the driving shaft, a further shaft revolvable within said hollow shaft, a flywheel adapted to be charged by the said driving shaft and mounted on said further shaft, and a hydraulic coupling the rotatable wheels of which are connected with the said hollow shaft and said further shaft respectively.

11. A gear system, comprising a main driving shaft, a driven shaft, a coupling interposed between said driving and driven shafts and adapted to connect or disconnect the shafts, a second pair of shafts, a gearing connecting the one shaft of said second pair with the driving shaft, a flywheel adapted to be charged by said driving shaft and mounted on the second shaft of the said second pair, a converter having a stationary wheel and rotatable wheels the latter of which are connected with the two shafts of the second pair respectively, said converter serving for charging the flywheel, and a second converter having a stationary wheel and rotatable wheels the latter of which are connected with the two shafts of the second pair respectively and serving for discharging the flywheel.

12. A gear system, comprising a main driving shaft, a driven shaft, a coupling interposed between said driving and driven shafts and adapted to connect or disconnect the shafts, two further shafts, two gearings the one connecting the driving shaft and the other connecting the driven shaft with the two further shafts, a flywheel on each of said further shafts, and a pair of hydraulic couplings on each of said further shafts, one coupling of said pairs being arranged between the flywheel and one gearing and the other between the flywheel and the other gearing.

13. A gear system according to claim 12, in which a converter having a stationary wheel is provided in place of one coupling of each pair.

14. A gear system, comprising a main driving shaft, a driven shaft, a coupling interposed between said driving and driven shafts and adapted to connect or disconnect the shafts, a second pair of shafts, a gearing connecting the one shaft of said second pair with the driving shaft, a converter having a stationary wheel and rotatable wheels the latter of which are connected with the two shafts of the second pair respectively, a further shaft, a second gearing connecting the second shaft of said second pair with said further shaft, and a flywheel adapted to be charged by said driving shaft and mounted on the further shaft.

15. A gear system, comprising a main driving shaft, a driven shaft, a coupling interposed between said driving and driven shafts and adapted to connect or disconnect the shafts, a plurality of further pairs of shafts, a gearing connecting the one shaft of each of said further pairs of shafts with the driving shaft, a plurality of flywheels adapted to be charged and discharged by said driving shaft and each mounted on one of the second shafts of said further pairs, and a plurality of converters each having a stationary wheel, the rotatable wheels of each converter being connected with the two shafts of one of the said further pairs of shafts respectively, and the gearing being so devised that one half of said flywheel rotates in the one direction and the other half in the other direction.

16. A gear system, comprising a main driving shaft, a driven shaft, a coupling interposed between said driving and driven shafts and adapted to connect or disconnect the shafts, a second pair of shafts, a gearing connecting the one shaft of said second pair with the driving shaft, a flywheel adapted to be charged by said driving shaft and mounted on the second shaft of said second pair, a converter having a stationary wheel and rotatable wheels the latter of which are connected with the two shafts of the second pair respectively, and means provided on the second shaft of said second pair of shafts and adapted to drive said second shaft directly thereby charging the flywheel.

HERMANN FÖTTINGER.